United States Patent [19]

Kromenaker et al.

[11] Patent Number: 5,014,294

[45] Date of Patent: May 7, 1991

[54] SPEAKERPHONE FOR CELLULAR TELEPHONES WITH HOWL PREVENTION, DETECTION, ELIMINATION AND DETERMINATION

[75] Inventors: Susan C. Kromenaker, Palatine; James D. Lefebvre, Cary; Charles P. Binzel, Hoffman Estates, all of Ill.

[73] Assignee: Motorola Inc., Schaumburg, Ill.

[21] Appl. No.: 473,294

[22] Filed: Feb. 1, 1990

[51] Int. Cl.⁵ .................. H04M 11/00; H04B 1/00
[52] U.S. Cl. ........................... 379/58; 379/56; 455/68; 455/70
[58] Field of Search ............... 370/32, 32.1; 379/56, 379/58, 61, 63, 102, 416; 455/70

[56] References Cited

U.S. PATENT DOCUMENTS

| | | | |
|---|---|---|---|
| 4,627,098 | 12/1986 | Dolikiar et al. | 455/70 |
| 4,629,829 | 12/1986 | Puhl et al. | 379/58 |
| 4,682,957 | 7/1987 | Young | 434/307 |
| 4,737,976 | 4/1988 | Borth et al. | 379/58 |
| 4,741,018 | 4/1988 | Potratz et al. | 379/58 |
| 4,843,621 | 6/1989 | Potratz | 379/58 |

OTHER PUBLICATIONS

IBM Technical Disclosure Bulletin vol. 33 #1B Jun. 1990.

Primary Examiner—Jin F. Ng
Assistant Examiner—William Cumming
Attorney, Agent, or Firm—Rolland R. Hackbart

[57] ABSTRACT

A unique speakerphone for celluar telephones includes in the transmit audio path between microphone 112 and transmitter 118, a transmitter mute switch which disconnects the audio path to the transmitter from the microphone 112, and transmit gain amplifier that is controlled to lower the feedback the microphone can pickup from the speaker 110. In the feedback path to the radiotelephone receiver 120 from the cellular base station 122 and the land line telephone system 124, the speakerphone includes the controlled amplifier 106 which is fed into the speaker mute gate, and the speaker 110 to close the feedback loop. De-emphasized audio is sampled by the A/D 102 on both the microphone-to-transmittr side of the loop and the receiver-to-speaker side of the loop. The microcomputer 104 is able to detect and eliminate howl, as well as determine whether howl exists, from the A/D sampling.

8 Claims, 4 Drawing Sheets ced by the microphone and the transmit gain amplifier 114

SPEAKERPHONE FOR CELLULAR TELEPHONES WITH HOWL PREVENTION, DETECTION, ELIMINATION AND DETERMINATION

BACKGROUND OF THE INVENTION

The present invention is generally related to radiotelephones, and more particularly to an improved speakerphone for cellular telephones.

When a cellular radiotelephone is operating in the full duplex mode, speakerphone audio signals from the speaker audio may be added to the microphone audio within the immediate acoustic environment, in the case of an automobile this would be in the passenger compartment. This new signal can then be propagated through the cellular radiotelephone transmitter, the cellular base station and land line telephone path, back into the receiver side of the cellular radiotelephone and finally back to the speaker audio output to produce an irritating feedback howl. This is due to the gain being added to the acoustical feedback loop by the different parts of the loop, i.e., the cellular telephone, the cellular base station, and the land line telephone system. The tendency to do this is strongly dependent on the land line telephone system to which the the cellular base station interfaces. Many countries regulate the amount of speaker to microphone coupling they will allow because high sidetone levels in their land line telephone systems result in the production of this irritating feedback howl, if the acoustical coupling is not minimized to preclude it. For the foregoing reasons, there is a need for a cellular telephone with a speakerphone that will allow the cellular radiotelephone system to function with land line telephone systems, which are characterized by high sidetone levels that have a propensity to introduce undesirable feedback howl when speakerphones are used.

OBJECTS OF THE INVENTION

Accordingly, it is an object of the present invention to provide a unique speakerphone for cellular radiotelephones, where the audio signals can be dynamically controlled to minimize the amount of acoustical feedback, thereby preventing feedback howl from occuring when the speakerphone is operated in full duplex.

It is another object of the present invention to provide a unique speakerphone for cellular radiotelephones that will function even where the propensity to produce the feedback howl is exacerbated, and where feedback howl is made unavoidable, by high sidetone levels present in the land line telephone system.

SUMMARY OF THE INVENTION

The present invention encompasses a speakerphone having a duplex mode and a simplex mode for a radiotelephone for communicating voice signals by way of a radio channel, and a method for detecting acoustic feedback in the speakerphone. The radiotelephone includes a radio for transmitting a first signal including voice signals on the radio channel and receiving a second signal including voice signals from the radio channel. The speakerphone comprises a microphone for producing the first signal; a speaker for emitting the second signal; a first amplifier having an input coupled to the microphone and an output coupled to the radio and being responsive to first digital control signals for selecting one of a plurality of gain settings and amplifying the first signal; a first switch coupled between the output of the first amplifier and the radio and being responsive to a third control signal for substantially muting the first signal; a second amplifier having an input coupled to the radio and an output coupled to the speaker and being responsive to second digital control signals for selecting one of a plurality of gain settings and amplifying the second signal; a second switch coupled between the output of the second amplifier and the speaker and being responsive to a fourth control signal for substantially muting the second signal; converting circuitry for producing first and second digital samples of the output of the first amplifier and the input of the second amplifier, respectively; and processing circuitry coupled to the first and second digital samples of the converting circuitry for detecting voice signals in the first and second signals, respectively; in response to detection of voice signals in one of the first and second signals, the processing circuitry producing in the duplex mode the first and second digital control signals for adjusting the gain settings of the first amplifier and the second amplifier such that the gain setting for the one of the first and second signals is decreased by a first predetermined gain; in response to detection of voice signals in one of the first and second signals, the processing circuitry producing in the simplex mode the third and fourth control signals for muting one of the first and second signals, respectively; and the processing circuitry monitoring a predetermined number of consecutive second digital samples and reducing the first predetermined gain by a second predetermined gain if the predetermined number of consecutive second digital samples have magnitudes differing by less than a third predetermined gain and the first predetermined gain has not been reduced, and switching to the simplex mode if the predetermined number of consecutive second digital samples have magnitudes differing by less than a third predetermined gain and the first predetermined gain has been reduced at least one time.

DETAILED DESCRIPTION OF THE PREFERRED EMBODIMENT

Figure 1:
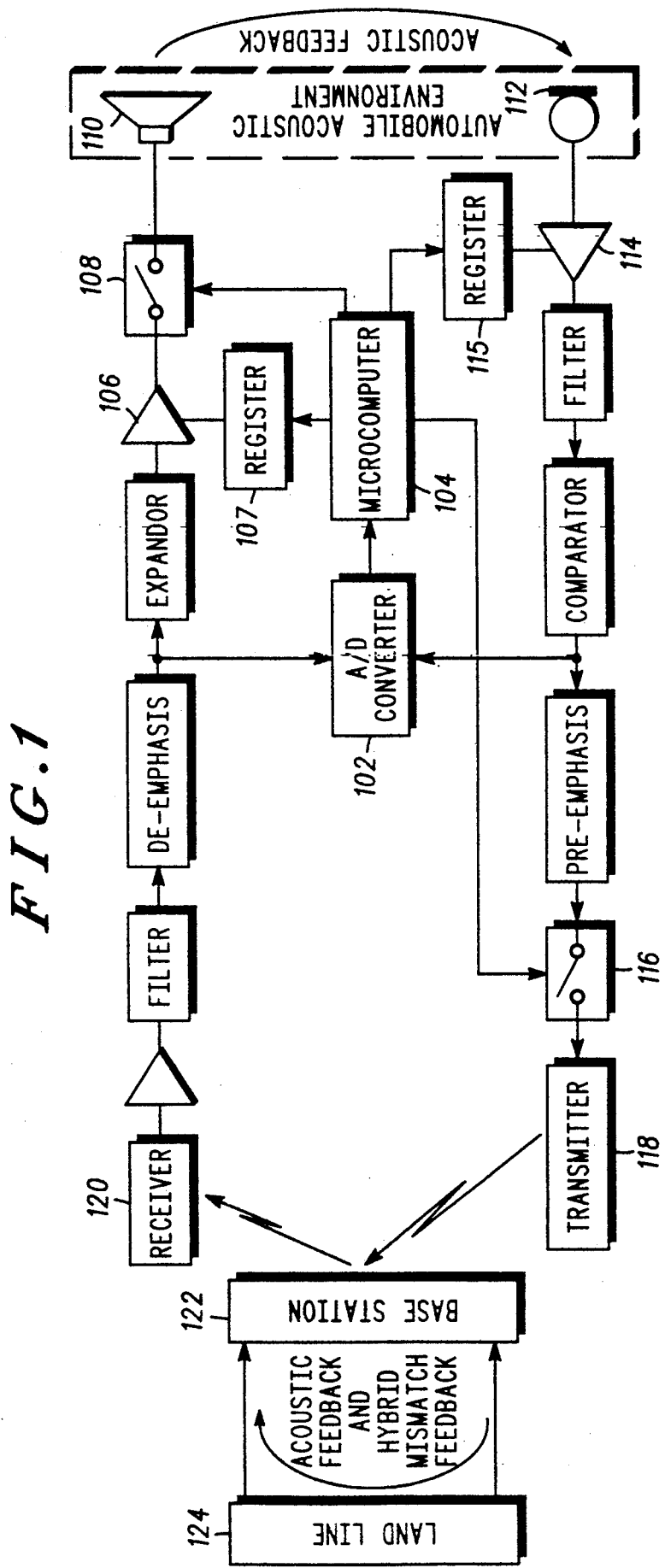
FIG. 1 is a block diagram of a land line network, a cellular base station, and a cellular telephone including a speakerphone embodying the present invention.

Referring to FIG. 1, it generally illustrates the cellular telephone feedback path that couples the speaker audio to the microphone 112 in a closed loop, out to the RF environment through the transmitter 118 and back into the radiotelephone through the receiver 120. There is illustrated a block diagram of a cellular telephone transmitter 118, the transmitter mute switch 116 which disconnects the audio path to the transmitter from the microphone 112, and the transmit gain amplifier 114 that is controlled to lower the feedback the microphone can pickup from the speaker 110. FIG. 1 depicts the feedback path to the radiotelephone receiver 120 from the cellular base station 122 and the land line telephone system 124, which subsequently reaches the controlled amplifier 106 which is fed into the speaker mute gate 108 and the speaker 110 to close the feedback loop. De-emphasized audio is sampled by the A/D 102 on both the microphone-to-transmitter side of the loop and the receiver-to-speaker side of the loop. The microcomputer 104 is able to detect and eliminate howl, as well as determine whether howl exists, from the A/D sampling.

Figure 2:
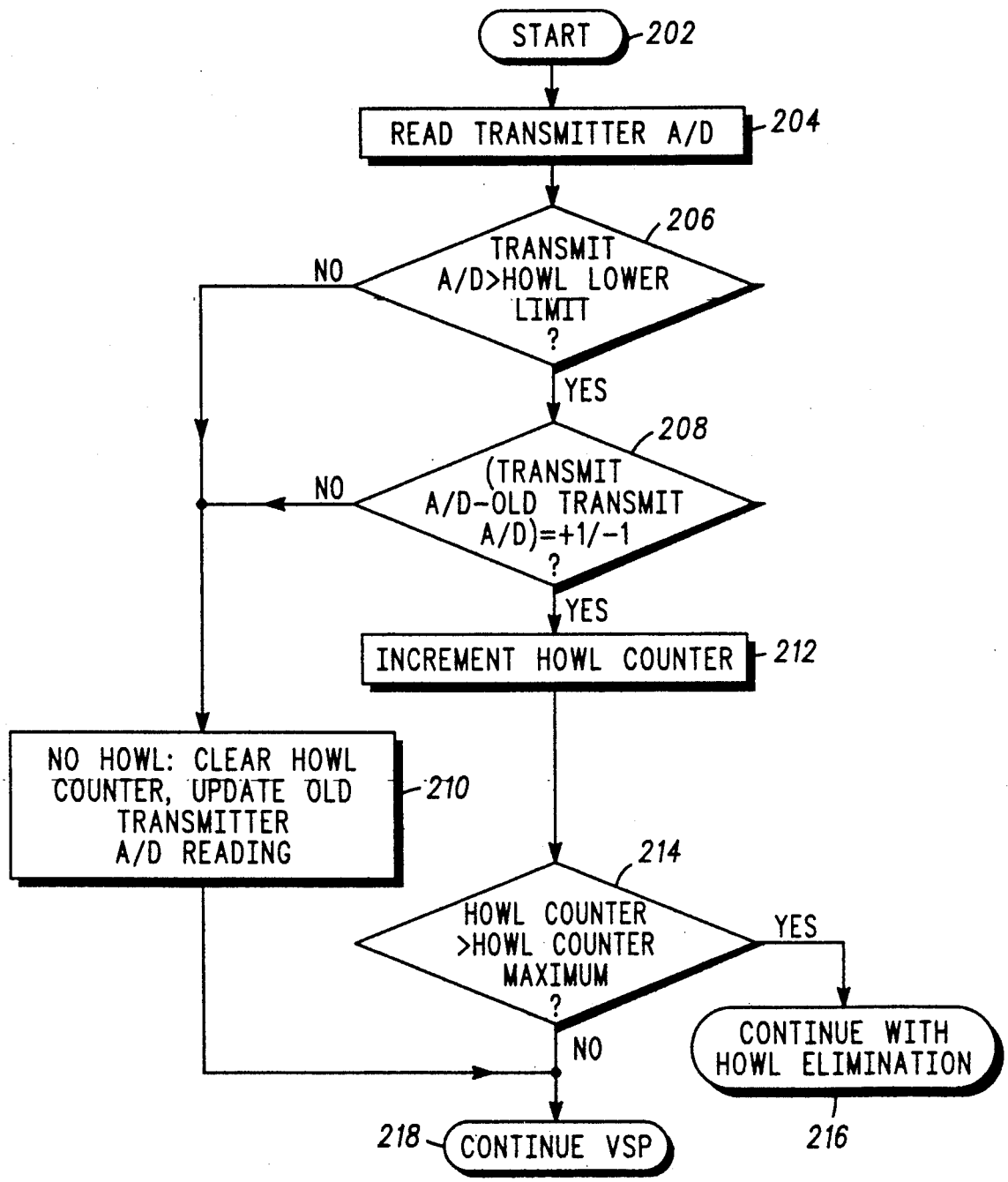
FIG. 2 is a flow chart for the process used by microcomputer 104 in FIG. 1 to detect when the conditions are present for feedback howl to occur.

Referring next to FIG. 2, there is illustrated a flow chart for the process used by the microcomputer 104 in FIG. 1 to detect when a possible howl condition has occurred. The process is entered at Start block 202. The process proceeds to decision block 204, where microcomputer 104 in FIG. 1 reads the A/D 102 in FIG. 1 which has sampled the compressed audio, TX A/D, before it reaches the transmit mute switch 116 in FIG. 1. If the TX A/D 102 in FIG. 1 does not contain a value greater than a threshold value necessary for howl to occur at block 206, the NO branch is taken to block 210. At block 210 the new TX A/D value is stored, and the counter which indicates the number of times the howl conditions have been detected through a FIG. 2 process is cleared. If at decision block 206, the TX A/D sample indicated that a level greater than the howl threshold level has been detected, the YES branch goes to decision block 208. At block 208, the new TX A/D value is read and compared to the previous TX A/D level. If the value is greater than one unit, then there is no howl condition detected, and the NO branch goes to block 210. If the difference between the previous TX A/D and present TX A/D is less than one unit, then the YES branch is taken to block 212 to indicate a howl condition is present. At block 212, a counter is incremented to indicate the howl condition is present for another cycle where the microcomputer 104 has read the TX A/D. Next at decision block 214 microcomputer 104 compares the number of cycles where the howl conditions are present to an empirically determined number stored in memory, if the number of cycles does not exceed this empirically determined number, no action is taken to eliminate howl, and the process continues to block 218. If the number of cycles where howl conditions are present has reached the empirically determined number, then microcomputer 104 will take action to eliminate howl by taking the YES branch to block 216. Block 216 is used to enter the process depicted in FIG. 3.

Figure 3:
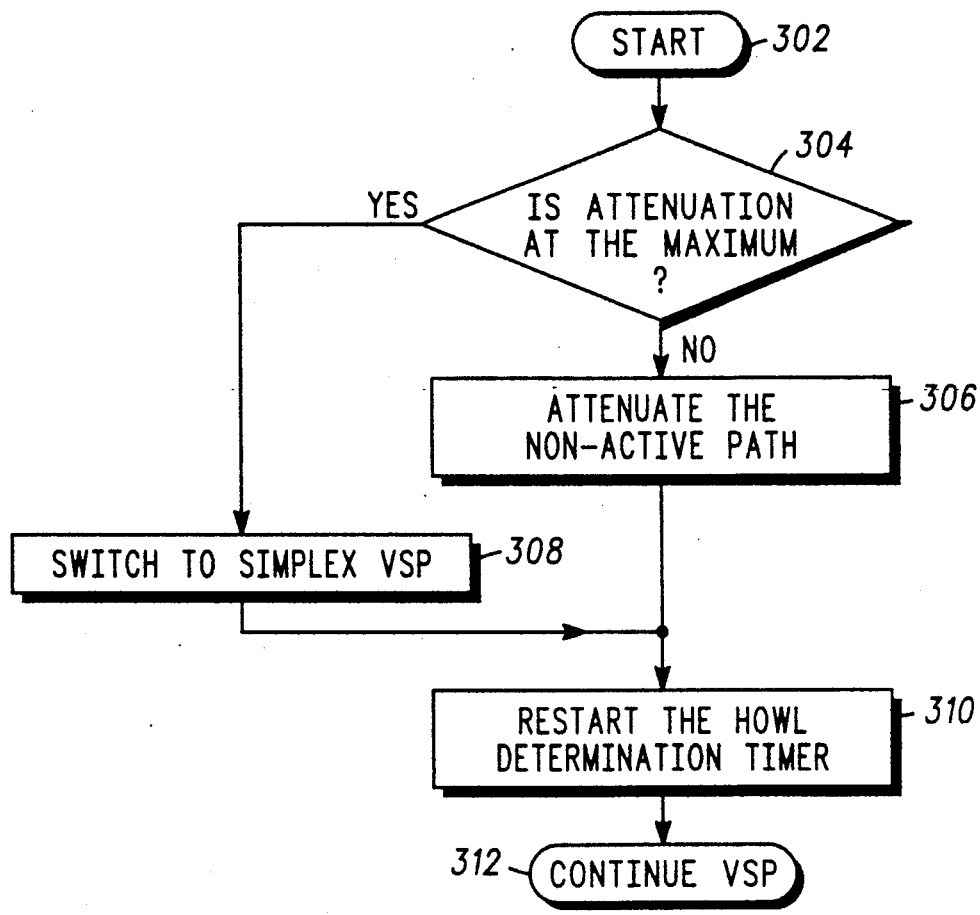
FIG. 3 is a flow chart for the process used by microcomputer 104 in FIG. 1 for eliminating the feedback howl after the conditions for feedback howl to occur have been met.

The FIG. 3 process depicts the actions taken by the microcomputer 104 to eliminate howl after the howl conditions depicted in FIG. 2 have been met. The microcomputer 104 checks in block 304, to determine if the attenuation in the non-active audio path is at a maximum. If the attenuation in the non-active path is not a maximum, then the flow diagram takes the NO branch to block 306. Block 306 depicts the microcomputer 104 attenuating the non-active path to further decouple the active from the non-active paths. If it is determined at block 304 that the maximum attenuation is present in the non-active path, then the microcomputer 104 mutes the non-active path to eliminate howl, this is shown by the YES branch from block 304 to block 308. This muting function is accomplished by microcomputer 104 by opening one of the two mute switches 116 or 108 in FIG. 1, which are coupled to microcomputer 104. After the non-active attenuation path has been maximized or incremented, a timer, howl determination timer, whose time span has been empirically determined is initiated. This howl determination timer will count for a given amount of time and then put the attenuation levels in registers 107 and 115 back to the default values (see Table 1) which are set by microcomputer 104 as a function of the audio volume adjustment setting 106 in FIG. 1. These default value settings for attenuation amplifiers 114 and 106 can be set at any incremental level limited only by the amplifiers dynamic range, and the amount of microcomputer capacity allocated to the control function.

Table 1 is a list of illustrative default values used by microcomputer 104 to set the gain of amplifiers 114 and 106, and to set the states of the switches 116 and 108 dependent on the volume control setting adjustment of the radiotelephone.

TABLE 1

| Volume Level | VSP TYPE | Attenuation | Microphone Gain Level |
|---|---|---|---|
| 7 | Simplex | — | Low |
| 6 | Duplex | −20 dB | Low |
| 5 | Duplex | −20 dB | Low |
| 4 | Duplex | −15 dB | Normal |
| 3 | Duplex | −15 dB | Normal |
| 2 | Duplex | −15 dB | Normal |
| 1 | Duplex | −15 dB | Normal |
| 0 | Duplex | −15 dB | Normal |

Other attenuation levels could be set, Table 1 simply indicates values actually used to obtain satisfactory anti-howl performance in particular countries. Low values in Table 1 are empirically determined by the propensity of the cellular radiotelephone's speakerphone to produce howl when operated with a particular land line system. Similarly Normal values are determined empirically from performance with the particular land line system. After the howl determination timer is started in block 310, the flow diagram proceeds to block 312 which is continued with the process depicted in FIG. 4.

Figure 4:
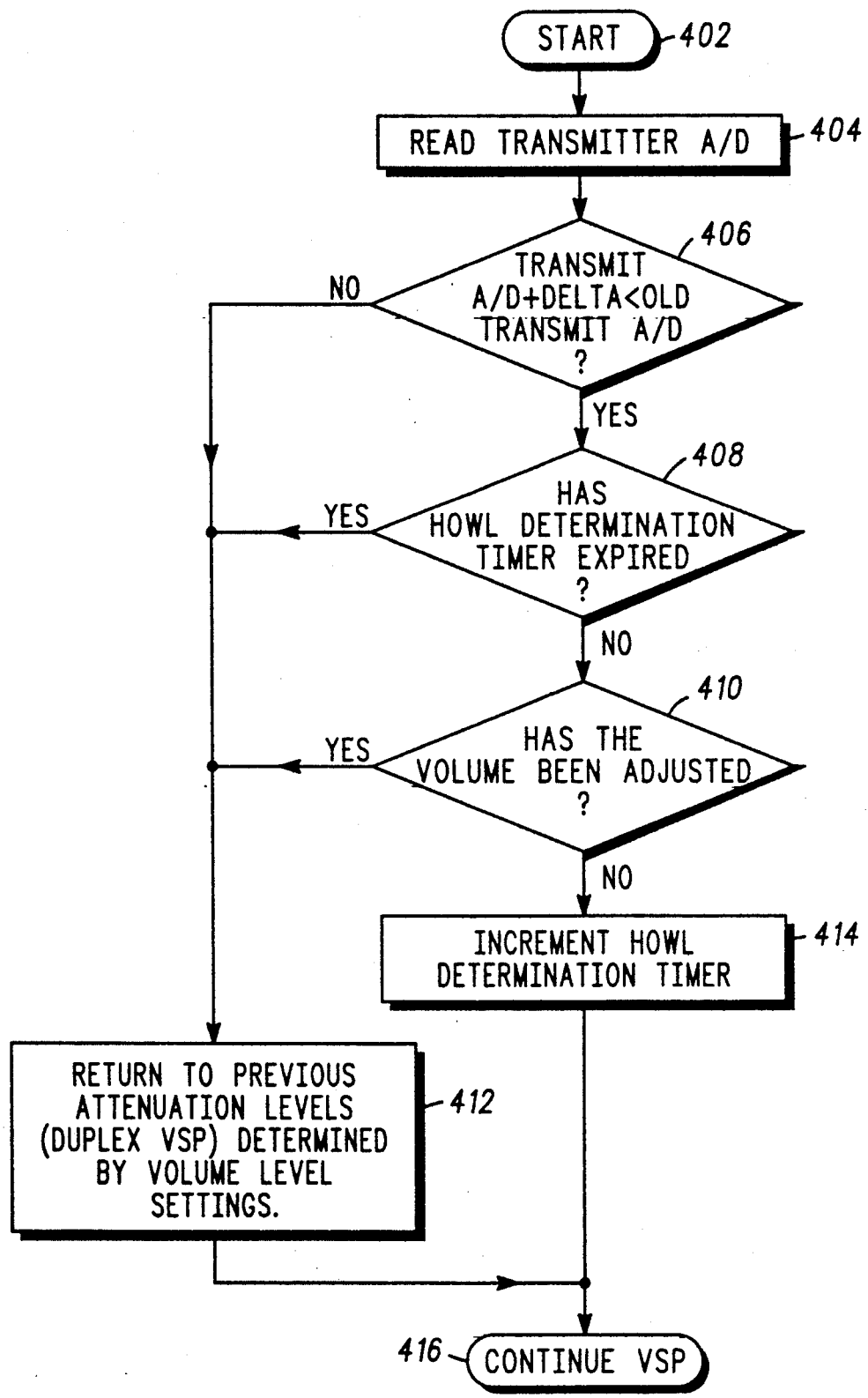
FIG. 4 is a flow chart for the process used by microcomputer 104 in FIG. 1 for determining whether feedback howl was in fact present when the process in FIG. 2 detected the howl conditions.

Referring to the FIG. 4 process, which is a continuation from block 312 in FIG. 3, the microcomputer reads an audio sample from the microphone-to-transmitter path through the A/D 102 in FIG. 1, TX A/D. The flow diagram then proceeds to decision block 406 where the microcomputer 104 checks to see what the audio signal response was to the howling elimination steps taken as per blocks 308 or 306 of FIG. 3. If the level read through the A/D, TX A/D, is not less than DELTA below the previous TX A/D reading, then the microcomputer 104 has determined that no howl has actually occurred, and it takes the NO branch to block 412 in FIG. 4. DELTA has been empirically determined. At block 412, the attenuation levels at amplifiers 114 and 108 in FIG. 1 are returned to the previous attenuation levels determined by the volume level setting. If the level read from the TX A/D has dropped greater than DELTA below the previous reading at decision block 406, then the microcomputer 104 continues to implement the howl elimination steps taken as per blocks 308 or 306 in FIG. 3, and it now will check to see if the howl elimination timer which was started at block 310 in FIG. 3 has expired, this path is the YES branch from decision block 406 to block 408. If it has expired, the microcomputer 104 will proceed as per block 412 to return to the previous attenuation levels as determined by the volume level setting; this action is depicted as the YES branch from decision block 408. If the howl determination timer has not expired, the microcomputer 104 next checks to see if the volume has been adjusted, this action is depicted as the NO branch from decision block 408 to decision block 410. At decision block 410, if the microcomputer 104 determines the volume control was adjusted, it will reset the attenuation levels to the default values as per a Table like Table 1, this is the YES branch from decision block 410 to block 412. Again, Table 1 default values are determined by the land line system with which the cellular telephone has to operate. If the volume control has not been adjusted, then the microcomputer 104 proceeds as per the NO branch from decision block 410 to block 414. As per block 414, the microcomputer 104 simply increments the howl determination timer. The flow diagram next depicts the microcomputer 104 process proceeding from block 414 to block 416, which means the microcomputer 104 has continued to implement the howl elimination action taken as per block 306 or block 308 in FIG. 3. At block 416, the process of howl detection, howl elimination, and howl determination has been cycled one time, and the next cycle will begin as depicted in block 202 FIG. 2. If the cycle is completed with the process flowing as depicted by the branch from block 414 to block 416, then the howl elimination actions as per blocks 306 and 308 will be present when the cycle is restarted as per block 202 in FIG. 2. If, alternatively, the microcomputer 104 process had flowed as depicted by the branch from block 412 to block 416, then the microcomputer 104 will start the new cycle at block 202 FIG. 2 with the attenuation levels at default levels as per a Table like Table 1.

Cellular telephone transmitter 118 and radio receiver 120 and the unmarked blocks in FIG. 1 may be similar blocks of any conventional cellular telephone transceiver, such as, for example, the transceiver shown and described in Motorola instruction manual number 68P81066E40, entitled "DYNATAC Cellular Mobile Telephone 800MHZ Transceiver," published by and available from Motorola C & E Parts, 1313 East Algonquin Road, Schaumburg, Ill. 60196.

In summary, a unique speakerphone for cellular telephones has been described that will function even where the propensity to produce the feedback howl is exacerbated, or feedback howl is made unavoidable, by high sidetone levels present in the land line telephone system.

We claim:

1. A speakerphone having a duplex mode and a simplex mode for a radiotelephone for communicating voice signals by way of a radio channel, said radiotelephone including radio means for transmitting a first signal including voice signals on the radio channel and receiving a second signal including voice signals from the radio channel, said speakerphone comprising:
    microphone means for producing the first signal;
    speaker means for emitting the second signal;
    first amplifying means having an input coupled to said microphone means and an output coupled to said radio means and being responsive to first digital control signals for selecting one of a plurality of gain settings and amplifying the first signal;
    first switch means coupled between the output of said first amplifying means and said radio means and being responsive to a third control signal for substantially muting the first signal;
    second amplifying means having an input coupled to said radio means and an output coupled to said speaker means and being responsive to second digital control signals for selecting one of a plurality of gain settings and amplifying the second signal;
    second switch means coupled between the output of said second amplifying means and said speaker means and being responsive to a fourth control signal for substantially muting the second signal;
    converting means for producing first and second digital samples of the output of the first amplifying means and the input of the second amplifying means, respectively; and
    processing means coupled to the first and second digital samples of said converting means for detecting voice signals in the first and second signals, respectively; in response to detection of voice signals in one of the first and second signals, said processing means producing in the duplex mode the first and second digital control signals for adjusting the gain settings of said first amplifying means and said second amplifying means such that the gain setting for said one of the first and second signals is decreased by a first predetermined gain; in response to detection of voice signals in one of the first and second signals, said processing means producing in the simplex mode the third and fourth control signals for muting one of the first and second signals, respectively; and said processing means monitoring a predetermined number of consecutive second digital samples and reducing the first predetermined gain by a second predetermined gain if the predetermined number of consecutive second digital samples have magnitudes differing by less than a third predetermined gain and said first predetermined gain has not been reduced, and switching to the simplex mode if the predetermined number of consecutive second digital samples have magnitudes differing by less than a third predetermined gain and said first predetermined gain has been reduced at least one time.

2. The speakerphone according to claim 1, wherein said processing means includes microcomputer means.

3. The speakerphone according to claim 1, wherein said first amplifying means includes first register means for storing the first digital control signals, said second amplifying means includes second register means for storing the second digital control signals, and said processing means is coupled to said first and second register means.

4. The speakerphone according to claim 3, wherein said processing means includes microcomputer means.

5. A method for detecting acoustic feedback in a speakerphone for a radiotelephone for communicating voice signals by way of a radio channel, said radiotelephone including radio means for transmitting a first signal including voice signals on the radio channel and receiving a second signal including voice signals from the radio channel, said speakerphone including microphone means for producing the first signal, speaker means for emitting the second signal, first microphone means and an output coupled to said radio means and being responsive to first digital control signals for selecting one of a plurality of gain settings and amplifying the first signal, second amplifying means having an input coupled to said radio means and an output coupled to said speaker means and being responsive to second digital control signals for selecting one of a plurality of gain settings and amplifying means such that the gain setting for said one of the first and second signals is increased to a nominal gain and the gain setting of the other of the first and second signals is decreased by a first predetermined gain, said method comprising the steps of:

producing first and second digital samples of the output of the first amplifying means and the output the second amplifying means, respectively;

monitoring a predetermined number of consecutive second digital samples;

reducing the first predetermined gain by a second predetermined gain if the predetermined number of consecutive second digital samples have magnitudes differing by less than a third predetermined gain and said first predetermined gain has not been reduced; and switching to simplex operation if the predetermined number of consecutive second digital samples have magnitudes differing by less than a third predetermined gain and said first predetermined gain has been reduced at least one time.

6. The method according to claim 5, wherein the gain settings of said second amplifying means may be changed by the user of said speakerphone, and said monitoring step includes the step of ignoring second digital samples for a predetermined time interval in response to a change in the gain setting of said second amplifying means by the user.

7. A method for detecting acoustic feedback in a speakerphone for a radiotelephone for communicating voice signals by way of a radio channel, said radiotelephone including radio means for transmitting a first signal including voice signals on the radio channel and receiving a second signal including voice signals from the radio channel, said speakerphone including microphone means for producing the first signal, speaker means for emitting the second signal, first microphone means and an output coupled to said radio means and being responsive to first digital control signals for selecting one of a plurality of gain settings and amplifying the first signal, second amplifying means having an input coupled to said radio means and an output coupled to said speaker means and being responsive to second digital control signals for selecting one of a plurality of gain settings and amplifying means such that the gain setting for said one of the first and second signals is increased to a nominal gain and the gain setting of the other of the first and second signals is decreased by a first predetermined gain, said method comprising the steps of:

producing first and second digital samples of the output of the first amplifying means and the output the second amplifying means, respectively;

monitoring a predetermined number of consecutive second digital samples;

reducing the first predetermined gain by a second predetermined gain if the predetermined number of consecutive second digital samples have magnitudes differing by less than a third predetermined gain and said first predetermined gain has not been reduced;

returning the reduced first predetermined gain to its previous value if consecutive second digital samples do not have a magnitude differing by less than a third predetermined gain; and switching to simplex operation if the predetermined number of consecutive second digital samples have magnitudes differing by less than a third predetermined gain and said first predetermined gain has been reduced at least one time.

8. The method according to claim 7, wherein the gain settings of said second amplifying means may be changed by the user of said speakerphone, and said monitoring step includes the step of ignoring second digital samples for a predetermined time interval in response to a change in the gain setting of said second amplifying means by the user.

* * * * *